(12) United States Patent
Ha

(10) Patent No.: US 8,856,836 B2
(45) Date of Patent: Oct. 7, 2014

(54) PROVIDING INFORMATION OF IMAGE DATA STORED IN DIGITAL IMAGE DISPLAY APPARATUS

(75) Inventor: Seung-Kwan Ha, Seoul (KR)

(73) Assignee: Humax Co., Ltd., Seongnam-Si, Gyeonggi-Do (KR)

( * ) Notice: Subject to any disclaimer, the term of this patent is extended or adjusted under 35 U.S.C. 154(b) by 1204 days.

(21) Appl. No.: 11/874,770

(22) Filed: Oct. 18, 2007

(65) Prior Publication Data

US 2008/0155606 A1 Jun. 26, 2008

(30) Foreign Application Priority Data

Dec. 26, 2006 (KR) .................. 10-2006-0133932

(51) Int. Cl.
*H04N 5/445* (2011.01)
*G06F 3/00* (2006.01)
*G06F 13/00* (2006.01)
*H04N 5/765* (2006.01)
*H04N 21/433* (2011.01)
*H04N 21/45* (2011.01)
*H04N 21/434* (2011.01)
*H04N 21/438* (2011.01)
*H04N 5/50* (2006.01)
*H04N 21/482* (2011.01)

(52) U.S. Cl.
CPC ............... *H04N 5/50* (2013.01); *H04N 5/765* (2013.01); *H04N 21/4331* (2013.01); *H04N 21/4532* (2013.01); *H04N 21/4345* (2013.01); *H04N 21/4383* (2013.01); *H04N 21/4821* (2013.01)
USPC ............. 725/52; 725/45; 725/46; 725/50; 725/56; 725/58; 348/731; 348/734

(58) Field of Classification Search
USPC ............................................. 725/45–46, 58
See application file for complete search history.

(56) References Cited

U.S. PATENT DOCUMENTS

| 5,646,796 A | * | 7/1997 | Kimura et al. | ............... 360/72.2 |
| 2002/0007492 A1 | * | 1/2002 | Smyth et al. | ............... 725/107 |

(Continued)

FOREIGN PATENT DOCUMENTS

| EP | 1 071 286 A1 | 1/2001 |
| EP | 1 492 348 A2 | 12/2004 |

(Continued)

OTHER PUBLICATIONS

European Search Report dated Dec. 11, 2008.

(Continued)

*Primary Examiner* — Jason Salce
(74) *Attorney, Agent, or Firm* — Ked & Associates, LLP

(57) ABSTRACT

A device and a method for providing information of image data stored in a digital image display apparatus and a recording medium recorded with a program for realizing the same are disclosed. According to an embodiment of the present invention, the device for providing information of image data stored in the digital image display apparatus can include a channel list generating unit, which searches for a broadcast channel received through the digital image display apparatus and generates channel list data, and a link unit, which links image data and information data, respectively, included in broadcast data, stored in the digital image display apparatus according to a broadcast selecting signal and a broadcast data storing signal, with the channel list data.

26 Claims, 7 Drawing Sheets

(56) References Cited

U.S. PATENT DOCUMENTS

| | | | |
|---|---|---|---|
| 2003/0044165 A1* | 3/2003 | Wood et al. | 386/83 |
| 2003/0142962 A1* | 7/2003 | Tsumagari et al. | 386/95 |
| 2004/0117858 A1* | 6/2004 | Boudreau et al. | 725/144 |
| 2004/0194135 A1 | 9/2004 | Kahn | 725/38 |
| 2004/0268403 A1* | 12/2004 | Krieger et al. | 725/112 |
| 2005/0210501 A1* | 9/2005 | Zigmond et al. | 725/32 |
| 2007/0094681 A1* | 4/2007 | Park | 725/37 |
| 2007/0130587 A1* | 6/2007 | Seok | 725/56 |

FOREIGN PATENT DOCUMENTS

| | | |
|---|---|---|
| EP | 1 684 500 A2 | 7/2006 |
| KR | 2003-0078217 | 10/2003 |
| WO | WO 00/16548 | 3/2000 |

OTHER PUBLICATIONS

Korean Office Action dated Oct. 25, 2007.

* cited by examiner

FIG. 5

| SVC Name | Start time | End time | Genre | Parentlock |
|---|---|---|---|---|
| 500 | 502 | 504 | 506 | 508 |

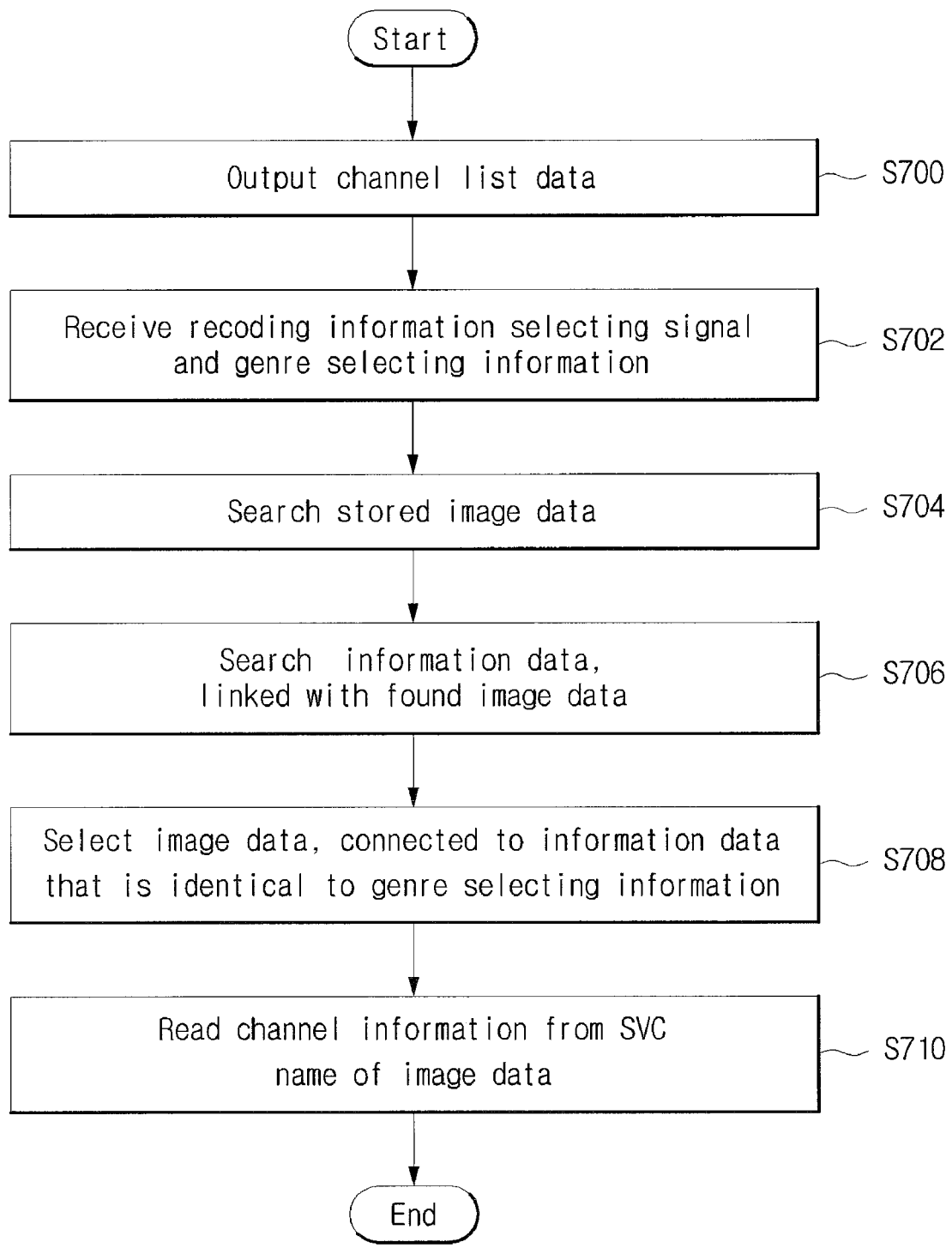

PROVIDING INFORMATION OF IMAGE DATA STORED IN DIGITAL IMAGE DISPLAY APPARATUS

CROSS-REFERENCE TO RELATED PATENT APPLICATIONS

This application claims the benefit of Korean Patent Application No. 10-2006-0133932, filed on Dec. 26, 2006, in the Korean Intellectual Property Office, the disclosure of which is incorporated herein in its entirety by reference.

BACKGROUND OF THE INVENTION

1. Field of the Invention

The present invention relates to a device and a method for providing information of image data stored in a digital image display apparatus and a non-transitory recording medium recorded with a program for realizing the same, more specifically to a device and a method capable of providing a variety of additional information of image data, stored in a digital image display apparatus, through a channel list, and a non-transitory recording medium recorded with a program for realizing the same.

2. Background Art

In this specification, a digital image display apparatus refers to an apparatus providing a high-quality moving picture service by using digital data, and particularly, capable of storing image data.

The digital image display apparatus is a set-top box, having functions which can receive a digital broadcast such as a digital television broadcast and a digital multimedia broadcasting (hereinafter, referred to as DMB) and can record the digital broadcast, a digital TV or a personal video recorder (PVR), capable of playing back the recorded digital broadcasting, but not limited thereto.

The image data includes video data, capable of being visually recognized, and audio data, capable of being aurally recognized.

One of the greatest benefits of digital broadcasting is that it has a much greater number of usable channels than the commonly used analog broadcast.

For example, the analog broadcast is merely used through approximately 50 channels by using a cable or a satellite, including 4 or 5 ground wave broadcasting channels.

The digital broadcast, however, can be used through a great deal of channels as compared with the analog broadcast because there is no restriction that different frequencies are required for each channel, unlike the existing analog broadcast.

As the number of channels of the digital broadcast increases, the number of channels capable of being used by a user also increases, to thereby increase the number of recordable broadcasts.

In accordance with the increase in the number of channels, for user's convenience, a channel memorizing function, which memorizes a desired channel number in advance for a user to make it easy to search usable channels, and a channel list providing function, which provides information related to a lot of usable channels, are being developed.

The channel list, which is alternatively called an electric program guide (EPG), provides usable channel information and a variety of information related to programs that are being broadcasted.

For example, when a user desires to know details related to a leading character of a movie that is being broadcasted, if the user selects an information list of the leading character, the user can acquire the details related to the leading character.

However, if the user plays back a movie that was recorded earlier, the user is unable to acquire the details related to the leading character.

In other words, in the case of having already recorded the digital broadcast, the user is unable to receive an additional service that was provided through the digital broadcast.

Further, if the user tries to search for desired image data of recorded broadcast programs, that is, stored image data, since their recording information is not separately provided, it is required for the user to memorize every name or information of the image data.

SUMMARY OF THE INVENTION

The present invention provides a device and a method for providing information of image data stored in a digital image display apparatus and a non-transitory recording medium recorded with a program for realizing the same that can supply information of a recorded broadcast, which is stored image data, to a user without user's searching through the stored image data.

The present invention also provides a device and a method for providing information of image data stored in a digital image display apparatus and a non-transitory recording medium recorded with a program for realizing the same that can allow a user to receive various additional services provided through a digital broadcast in spite of having already recorded the digital broadcast.

An aspect of the present invention features a device for providing information of image data stored in a digital image display apparatus.

According to an embodiment of the present invention, there is provided a device for providing information of image data stored in a digital image display apparatus, including a channel list generating unit, searching for a broadcast channel received through the digital image display apparatus and generating channel list data; and a link unit, linking image data and information data, respectively, with the channel list data, the image data and the information data being included in broadcast data, the broadcast data being stored in the digital image display apparatus according to a broadcast selecting signal and a broadcast data storing signal, whereas the channel list data is outputted through the digital image display apparatus to display link information of the image data and the information data and provides information of the image data by using the information data linked with the channel list data.

The channel list generating unit can renew stored channel list data if a new receivable broadcast channel is found.

The link unit can link the image data and the information data, respectively, to the channel list data by inserting a tag into a portion of the channel list data and including a link point connected to the tag in the image data and the information data.

The device for providing information can be included in the digital image display apparatus The digital image display apparatus can include a broadcast receiving unit, receiving broadcast data; an input unit, outputting an input signal corresponding to an inputted key; a processor, generating a control signal controlling an operation of the digital image display apparatus in accordance with the input signal outputted from the input unit; a display unit, outputting video data of the received broadcast data; a sound output unit, outputting audio data of the received broadcast data; a storing unit, storing the broadcast data; and a broadcast processing unit.

The broadcast data processing unit can also include a demodulating unit, removing a carrier wave from the broadcast data and demodulating the broadcast data, from which the carrier wave is removed, into a digital data stream; a transfer stream (TS) parsing unit, parsing the broadcast data into audio data and video data; a video element stream (ES) buffer, temporarily storing the parsed video data in order to output it through the display unit; and an audio element stream (ES) buffer, temporarily storing the parsed audio data in order to output it through the display unit.

The information data can include transport stream information and recording information of the image data, and the transport stream information can include at least one from the group consisting of frequency information of the broadcast data, broadcast signal symbolrate information, polar signal information of a broadcast signal and forward error correction (FEC) information.

The recording information can include at least one from the group consisting of channel information, information related to a start time and an end time of storing the broadcast data, genre information of image data and viewer-restriction information.

Another aspect of the present invention features a method for providing a recorded image in a digital image display apparatus.

According to an embodiment of the present invention, there is provided a method for providing information of image data stored in a digital image display apparatus, including generating channel list data by searching for a receivable broadcast channel in the digital image display apparatus and; and linking image data and information data, respectively, with the channel list data, the image data and the information data being included in broadcast data, the broadcast data being stored in the digital image display apparatus according to a broadcast selecting signal and a broadcast data storing signal, whereas the channel list data is outputted through the digital image display apparatus to display link information of the image data and the information data and provides information of the image data by using the information data linked with the channel list data.

Another aspect of the present invention features a non-transitory recording medium recorded with a program for executing a method for providing a recorded image in a digital image display apparatus.

According to an embodiment of the present invention, there is provided a non-transitory recording medium tangibly embodying a program of instructions executable by a digital image display apparatus to execute a method of providing information of image data stored in the image display apparatus, the non-transitory recorded medium being readable by the digital image display apparatus, including generating channel list data by searching for a receivable broadcast channel in the digital image display apparatus and; and linking image data and information data, respectively, with the channel list data, the image data and the information data being included in the broadcast data, the broadcast data being stored in the digital image display apparatus according to a broadcast selecting signal and a broadcast data storing signal, whereas the channel list data is outputted through the digital image display apparatus to display link information of the image data and the infolination data and provides information of the image data by using the information data linked with the channel list data.

In the generating step, the channel list data can be generated by renewing stored channel list data if a new receivable broadcast channel is found.

In the linking step, a tag can be inserted into a portion of the channel list data and a link point connected to the tag is included in the image data and the information data.

The linking step can further include storing the channel list data linked with the image data and the information data, respectively.

The channel list data can include information related to a channel capable of receiving the broadcast data, information related to a type of the broadcast data and information related to a tag linked with the information data.

The information data can include transport stream information and recording information of the image date, and the transport stream information can include at least one from the group consisting of frequency information of the broadcast data, broadcast signal symbolrate information, polar signal information of a broadcast signal and forward error correction (FEC) information.

The recording information can include at least one from the group consisting of channel information, information related to a start time and an end time of storing the broadcast data, genre information of image data and viewer-restriction information.

The providing information of the image data by using the information data can be performed by receiving a selecting signal of image data and information data; searching for the selected image data; and searching for information data linked with the found image data

BRIEF DESCRIPTION OF THE DRAWINGS

These and other features, aspects and advantages of the present invention will become better understood with regard to the following description, appended claims and accompanying drawings where:

FIG. 5 is a block diagram illustrating an example of the structure of recording information data linked with channel list data stored in a digital image display apparatus in accordance with an embodiment of the present invention;

FIG. 7 is a flow chart illustrating an example of a process displaying image data, the genre of which is a movie, of stored image data, and a list of channels, through which each image data is broadcasted, by using channel list data generated in accordance with an embodiment of the present invention.

DESCRIPTION OF THE EMBODIMENTS

Figure 1:
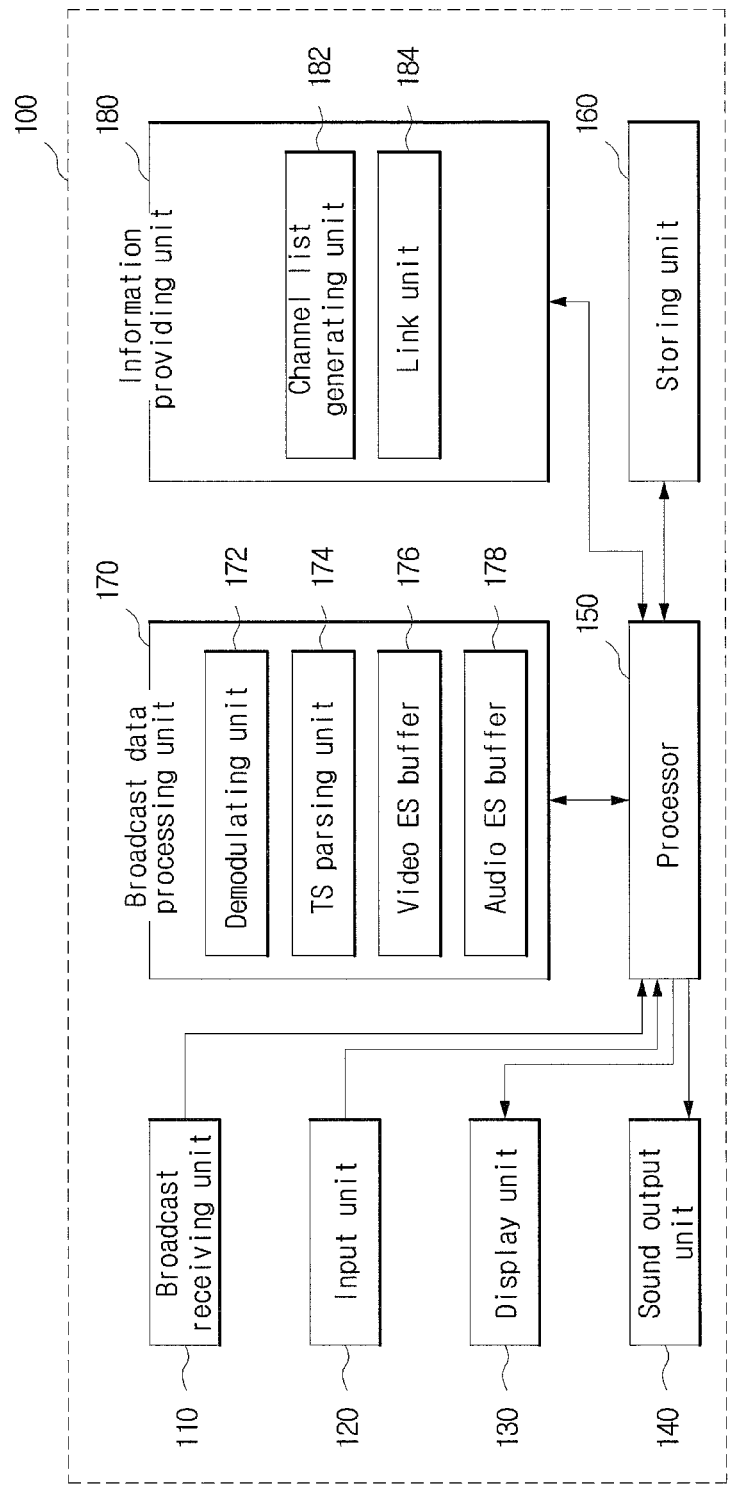
FIG. 1 is a block diagram illustrating a structure of a digital image display apparatus capable of including a device for providing information of stored image data in accordance with an embodiment of the present invention.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention.

Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other.

For instance, the first element can be named the second element, and vice versa, without departing the scope of claims of the present invention.

The term "and/or" shall include the combination of a plurality of listed items or any of the plurality of listed items.

When one element is described as being "connected" or "accessed" to another element, it shall be construed as being connected or accessed to the other element directly but also as possibly having another element in between.

On the other hand, if one element is described as being "directly connected" or "directly accessed" to another element, it shall be construed that there is no other element in between.

The terms used in the description are intended to describe certain embodiments only, and shall by no means restrict the present invention.

Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains.

Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

A structure of a digital image display apparatus including a device capable of providing information of the stored image data in accordance with the an embodiment of the present invention, which can receive not only stored image data but also a variety of information of the stored image data through a channel list, will be described with reference to FIG. 1.

As described above, in this specification, a digital image display apparatus, which refers to an apparatus providing a high-quality moving picture service by using digital data, and particularly, capable of storing image data, is a set-top box, having functions which can receive a digital broadcast such as a digital television broadcast and a digital multimedia broadcasting (hereinafter, referred to as DMB) and record the digital broadcast, a digital TV or a personal video recorder (PVR), capable of playing back the recorded digital broadcast, but not limited thereto.

The image data includes video data, capable of being visually recognized, and audio data, capable of being aurally recognized.

As illustrated in FIG. 1, the digital image display apparatus 100 including a device capable of providing information of the stored image data in accordance with the an embodiment of the present invention can include a broadcast receiving unit 110, an input unit 120, a display unit 130, a sound output unit 140, a processor 150, a storing unit 160, a broadcast data processing unit 170 and an information providing unit 180.

The broadcast receiving unit 110 receives a broadcast signal transmitted from a digital broadcasting apparatus, that is, digital broadcast data.

The input unit 120, which can include numeral keys and various functional keys, outputs to the processor 150 an input signal corresponding to the key inputted by a user.

The display unit 130 outputs video data of the received broadcast data, and the sound output unit 140 outputs audio data of the received broadcast data.

The processor 150 generates a control signal, controlling the digital image display apparatus 100, corresponding to the input signal outputted from the input unit 120.

The storing unit 10 stores a variety of information, necessary to control the operation of the digital image display apparatus 100, and broadcast data.

The broadcast data processing unit 170 processes the received broadcast data such that a user can watch the received broadcast data through the display unit 140 and the sound output unit 140.

The broadcast data processing unit 170 can include a demodulating unit 172, a transfer stream (TS) parsing unit 174, a video element stream (ES) buffer 176 and an audio ES buffer 178.

The demodulating unit 172 removes a carrier wave from the received broadcast data and demodulates the broadcast data, removed with the carrier wave, into a digital data stream.

The TS parsing unit 174 parses the broadcast data, demodulated in the demodulating unit 172, into audio data and video data.

The video ES buffer 176 temporally stores the parsed video data so as to output it through the display unit 140, and the audio ES buffer 178 temporally stores the parsed audio data so as to output it through the sound output unit 140.

The information providing unit 180 provides information of stored image data through a channel list, specialized by the present invention.

The information providing unit 180 can include a channel list generating unit 182 and a link unit 184.

The channel list generating unit 182 generates channel list data by searching a received broadcast channel through the digital image display apparatus 100 and using a list of the found channel. Then, if a new receivable broadcast channel is found, the channel list generating unit 182 allows the generated channel list data to be renewed.

The link unit 184 allows image data and information data, respectively, included in the broadcast data, to be linked with the channel list data.

The link unit 184 inserts a tag into a portion of the channel list data, generated by the channel list generating unit 182, and includes a link point connected to the tag in the image data and the information data, respectively, included in the broadcast data, in order to allow the image data and the information data, respectively, to be linked with the channel list data.

On the other hand, although the illustration of FIG. 1 is based on the assumption that the digital image display apparatus 100 is configured to include the information providing unit 184, it shall be obvious that the information providing unit 184 can be separately embodied so as to be connected to the digital image display apparatus 100 and provide information of stored image data to the digital image display apparatus 100.

The process of storing image data in a digital image display apparatus will be described with reference to the structure of the digital image display apparatus including a device capable of providing information of the stored image data in accordance with the an embodiment of the present invention.

Figure 2:
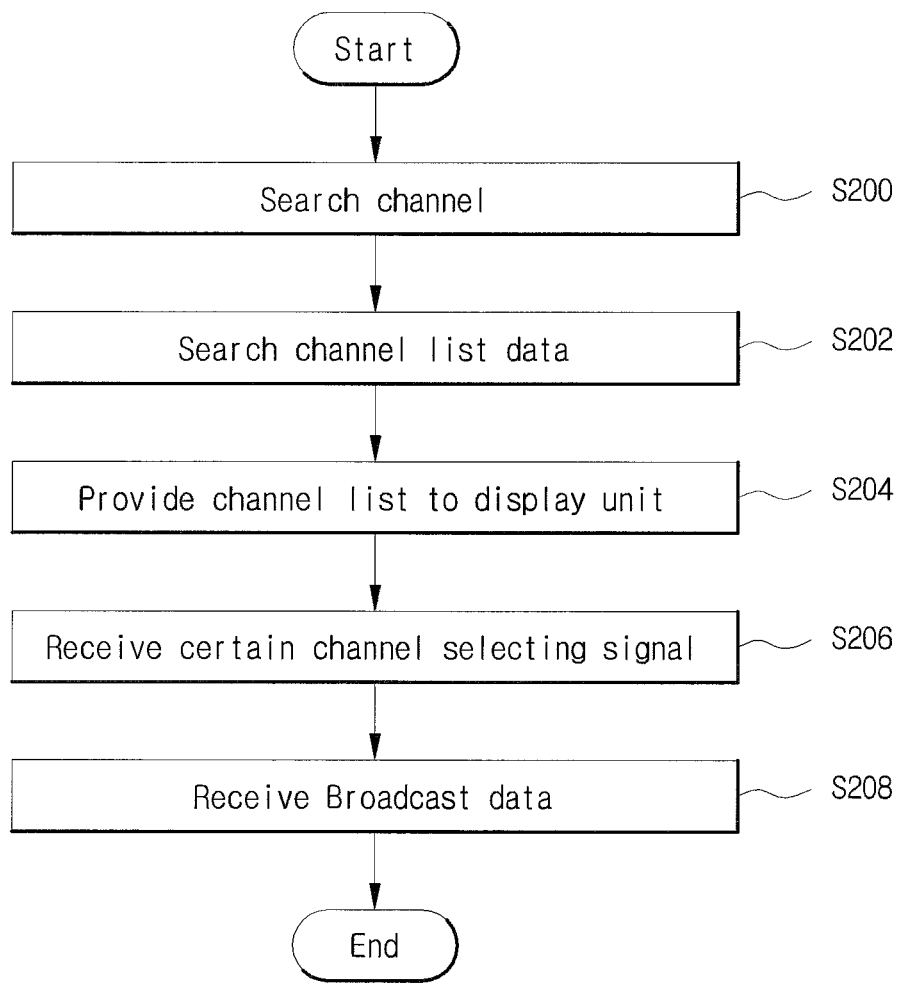
FIG. 2 is a flow chart illustrating a process storing image data in a digital image display apparatus in accordance with an embodiment of the present invention.

FIG. 2 is a flow chart illustrating a process storing image data in a digital image display apparatus.

As illustrated in FIG. 2, a step represented by S200 firstly searches a receivable channel by using a digital image display apparatus in order to store image data in the digital image display apparatus.

If the receivable channel is found, a step represented by S202 generates channel list data by using a list of the found channel. Then, a step represented by S204 provides the generated channel list data to a user as a channel list through a display unit of a device (e.g. a television), included in or connected to the digital image display apparatus.

The user can watch a desired channel by selecting the desired channel from the channel list.

If a step represented by S206 receives a selecting signal of a certain channel, selected in the channel list displaying a list of the channel found by the user, a step represented by S208 receives broadcast data that is being broadcasted in the pertinent channel.

The broadcast data includes image data, corresponding to broadcast contents, and information data having additional information such as genre of the pertinent broadcast, broadcast time, information related to characters of the broadcast.

If a user selects a function recording a broadcast program broadcasted through a selected channel in the digital broadcast, the broadcast program that is being recorded is separately stored as image data. The user must check the stored image data through a recording list separated from the channel list.

However, the present invention adds a portion, for indicating whether a pertinent broadcast is recorded, into the channel list data, and if the broadcast of the pertinent channel is recorded, allows a sign that the broadcast is recorded to be displayed on the portion added into the channel list data.

As described above, in the digital broadcast, not only the image data but also the information data including the additional information related to the image data are received.

The present invention stores the information data including the additional information of the recorded broadcast as well as the image data of the recorded broadcast in the digital image display apparatus.

The present invention can also provide a variety of information of the image data in addition to stored image data through the channel list by linking the channel list data with the stored image data and the information data.

A structure of channel list data capable of providing not only recording information of image data but also additional information of the image data will be described with reference to FIG. 3.

Figure 3:
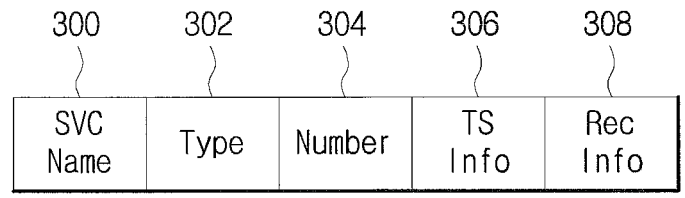
FIG. 3 is a block diagram illustrating a structure of sections of channel list data stored in a digital image display apparatus in accordance with an embodiment of the present invention.

FIG. 3 is a block diagram illustrating an example of a structure of sections of channel list data stored in a digital image display apparatus in accordance with an embodiment of the present invention.

As illustrated in FIG. 3, the channel list data stored in the digital image display apparatus in accordance with an embodiment of the present invention can be partitioned into sections such as SVC name 300, a type 302, a number 304, a TS info 306 and a Rec info 308, for example.

The SVC name 300 is a section displaying a name of a service channel receiving a digital broadcast.

The type 302 is a section indicating whether the received broadcast is a digital TV broadcast including both video data and audio data or a radio broadcast including audio data, and the number 304 is a section displaying the order of a channel which is found and provided through a channel list.

The TS info 306, displaying information related to a transport stream, and the Rec info 308, displaying recording information, can be stored with a tag for allowing the TS info 306 and the Rec info 308 to be connected to the transport stream data and the recording information data, respectively.

A link point, for being connected to the image data and the information data, respectively, can be generated in each of the image data and the information data by using a tag, in order to store the image data and the information data.

Figure 4:
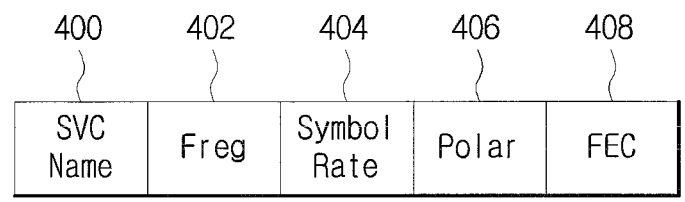
FIG. 4 is a block diagram illustrating an example of the structure of transport stream information data linked with channel list data stored in a digital image display apparatus in accordance with an embodiment of the present invention.

Referring to FIG. 4, the transport stream data, linked with the TS info 306 can be partitioned into sections such as a SVC name 400, a Freq 402, a symbolrate 404, a polar 406 and a FEC 408, for example.

In the case of moving picture experts group (MPEG) standard in association with the playback of moving pictures, the transport stream information refers to information related to a transport stream transporting image data and audio data through one stream.

The SVC name 400 is a section displaying a name of a service channel receiving a digital broadcast, and the Freq 402 is a section displaying frequency information of the channel receiving the broadcast.

The symbolrate 404 is a section displaying speed information transmitting a broadcast signal through a channel, and the polar 406 is a section displaying polar signal information of a broadcast signal.

The FEC 408 is a section displaying information related to forward error correction encoding transport data so as to detect and correct an error of the transport data and allowing a receiver to correct the error.

Referring to FIG. 5, the recording information data, linked with the Rec info 308, can be partitioned into a SVC name 500, a start time 502, an end time 504, a genre 506 and a parentlock 508, for example.

The SVC name 500 is a section displaying a name of a service channel receiving a digital broadcast, and the start time 502 and the end time 504 are sections stored with start time and end time, respectively, of a broadcast to be recorded.

The genre 506 is a section storing information of a genre (e.g. a movie, a soap opera and news) of a broadcast to be recorded, and the parentlock 508 is a section indicating whether a child is restricted to access adult contents.

A user can know whether a pertinent channel is recorded by using the structure of the channel list data and the structure of the information data, linked with the channel list data, and if there is a sign indicating that the pertinent channel is recorded, can acquire additional information of the recorded image data by selecting recording information from the channel list.

Figure 6:
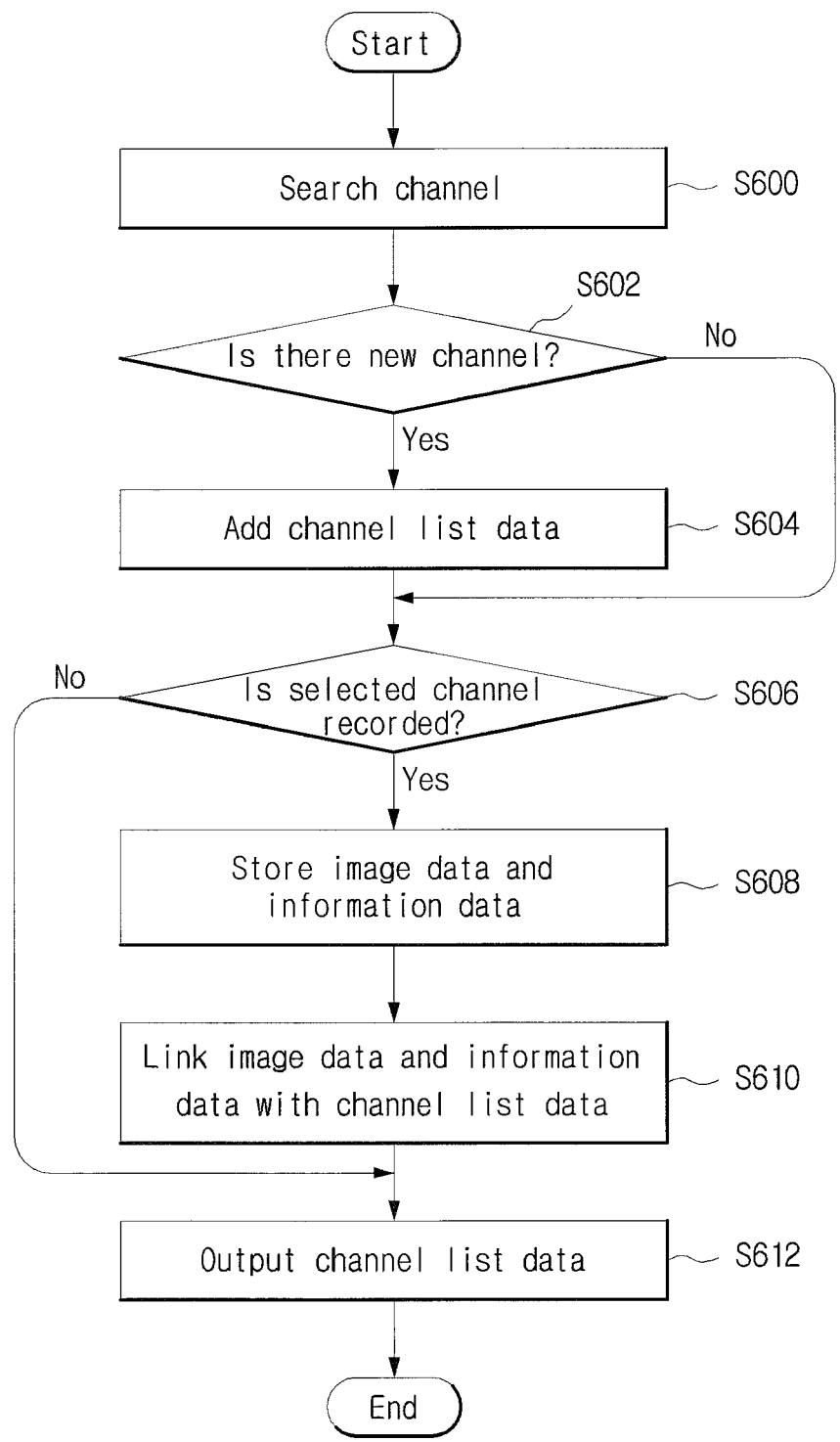
FIG. 6 is a flow chart illustrating a process displaying recording information of image data, stored in a digital image display apparatus, by using channel list data generated in accordance with an embodiment of the present invention.

Referring to FIG. 6, the process displaying recording information of image data, stored in a digital image display apparatus, by using channel list data generated in accordance with an embodiment of the present invention, will be described in more detail.

As illustrated in FIG. 6, if a digital image display apparatus is firstly operated, a step represented by S600 allows the digital image display apparatus to search a new channel.

A step represented by S602 determines whether a new channel is found. If the new channel is found, a step represented by S604 adds information related to the found new channel into channel list data.

A step represented by S606 determines whether a recording signal of a channel selected by a user is inputted. If the recording signal of the selected channel is inputted, a step represented by S608 stores image data and information data received from the selected channel.

A step represented by S610 links the stored image data and the stored information data, respectively, to the channel list data, and a step represented by S612 adds information, indicating that the image data is stored, into the channel list data and outputs the channel list data.

The process, generating channel list data by the same order as described with reference to FIG. 6 and storing information data, linked with the channel list data, and then checking recording information, indicating whether image data is stored, by using a channel list and checking additional information of the stored image data, will be described with reference to FIG. 7.

FIG. 7 is a flow chart illustrating an example of a process of displaying image data, the genre of which is a movie, of stored image data, and a list of channels, through which each image data is broadcasted, by using channel list data generated in accordance with an embodiment of the present invention.

FIG. 7 is a flow chart illustrating an example of a process of displaying an image datum, the genre of which is a movie, of stored image data and a list of channels, which each image data is broadcasted through, by using channel list data generated in accordance with an embodiment of the present invention.

As illustrated in FIG. 7, a step represented by S700 firstly outputs channel list data by reading the channel list data from the digital image display apparatus and displaying the channel list data on a display unit of the digital image display apparatus or a device (e.g. a television), connected to the digital image display apparatus, in order to check recording information and additional information of image data by using the channel list.

If a user selects recording information and a movie for a genre, a step represented by S702 allows the digital image display apparatus to receive a recording information selecting signal and genre selecting information.

A step represented by S704 searches the stored image data according to the recording information selecting signal, and a step represented by S706 searches the information data, linked with the found image data.

A step represented by S708 selects the information data, identical to the genre selecting information, and the image data, connected to the selected information data, from the found information data.

A step represented by S710 reads channel information from a SVC name corresponding to the channel information in the selected image data and displays the channel information on a display unit of a device (e.g. a television), included in or connected to the digital image display apparatus, such that information including additional information of the stored image data can be provided to a user through the channel list.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

What is claimed is:

1. A device for providing information of image data stored in a digital image display apparatus, the device comprising:
  a channel list generator to search for a broadcast channel received through the digital image display apparatus and to generate channel list data, the channel list data is electronic program guide (EPG) data for an electronic program guide to be displayed on the digital image display apparatus; and
  a linker to link image data and information data, respectively, with the channel list data, the image data and the information data being included in broadcast data, the broadcast data and the information data being stored in the digital image display apparatus in response to a broadcast data storing signal received for recording a program corresponding to the image data, wherein the information data includes a textual description of the stored image data, wherein:
  the channel list data is outputted through the digital image display apparatus to display link information of the image data and the information data, and
  the stored information data corresponding to the image data is displayed as a result of the stored information data being linked with the image data when the image data is selected from the channel list data,
  wherein the linker links the image data and the information data, respectively, to the channel list data by providing a tag into a portion of the channel list data generated by the channel list generator and including a link point connected to the tag in the stored image data and the stored information data, the tag being information that indicates a program is tagged, and the link point being information that indicates a point that is linked with the tag.

2. The device of claim 1, wherein the channel list generator renews stored channel list data when a new receivable broadcast channel is found.

3. The device of claim 1, wherein the device for providing information is included in the digital image display apparatus.

4. The device of claim 1, wherein the digital image display apparatus comprises:
  a broadcast receiving unit to receive broadcast data;
  an input unit to output an input signal corresponding to an inputted key;
  a processor to generate a control signal for controlling an operation of the digital image display apparatus in accordance with the input signal outputted from the input unit;
  a display unit to output video data of the received broadcast data;
  a sound output unit to output audio data of the received broadcast data;
  a storing unit to store the broadcast data; and
  a broadcast processing unit.

5. The device of claim 4, wherein the broadcast processing unit comprises:
  a demodulator to remove a carrier wave from the broadcast data and demodulate the broadcast data, from which the carrier wave is removed, into a digital data stream;
  a transfer stream (TS) parser to parse the broadcast data into audio data and video data;
  a video element stream (ES) buffer to temporally store the parsed video data in order to output it through the display unit; and an audio element stream (ES) buffer to temporally store the parsed audio data in order to output it through the display unit.

6. The device of claim 1, wherein the information data includes transport stream information and recording information of the image data.

7. The device of claim 6, wherein the transport stream information comprises at least one from the group consisting of frequency information of the broadcast data, broadcast signal symbol rate information, polar signal information of a broadcast signal and forward error correction (FEC) information.

8. The device of claim 6, wherein the recording information comprises at least one from the group consisting of channel information, information related to a start time and an end time of storing the broadcast data, genre information of image data and viewer-restriction information.

9. A method for providing information of image data stored in a digital image display apparatus, the method comprising:
generating channel list data by searching for a receivable broadcast channel in the digital image display apparatus; and
linking image data and information data, respectively, with the channel list data, the image data and the information data being included in broadcast data, the broadcast data being stored in the digital image display apparatus in response to a broadcast data storing signal received for recording a program corresponding to the image data, wherein linking the image data and the information data includes providing a tag into a portion of the channel list data and a link point connected to the tag is included in the stored image data and the stored information data, the tag being information that indicates a program is tagged, and the link point being information that indicates a point that is linked with the tag, wherein:
the channel list data is outputted through the digital image display apparatus to display link information of the image data and the information data, and
the stored information data corresponding to the image data is displayed as a result of the stored information data being linked with the image data when the image data is selected from the channel list data,
the channel list data is electronic program guide (EPG) data for an electronic program guide to be displayed on the digital image display apparatus, and wherein the information data includes a textual description of the stored image data.

10. The method of claim 9, wherein, in generating the channel list data, the channel list data is generated by renewing stored channel list data when a new receivable broadcast channel is found.

11. The method of claim 9, wherein said linking includes storing the channel list data linked with the image data and the information data, respectively.

12. The method of claim 9, wherein the channel list data comprises information related to a channel capable of receiving the broadcast data, information related to a type of the broadcast data and information related to a tag linked with the information data.

13. The method of claim 9, wherein the information data includes transport stream information and recording information of the image data.

14. The method of claim 13, wherein the transport stream information comprises at least one from the group consisting of frequency information of the broadcast data, broadcast signal symbol rate information, polar signal information of a broadcast signal and forward error correction (FEC) information.

15. The method of claim 13, wherein the recording information comprises at least one from the group consisting of channel information, information related to a start time and an end time of storing the broadcast data, genre information of image data and viewer-restriction information.

16. The method of claim 9, wherein providing information of the image data by using the information data is performed by:
receiving a selecting signal of image data and information data;
searching for the selected image data; and
searching for information data linked with the found image data.

17. A non-transitory computer readable medium tangibly embodying a program of instructions executable by a digital image display apparatus to execute a method of providing information of image data stored in the image display apparatus, the non-transitory computer readable medium being readable by the digital image display apparatus, the program comprising:
generating channel list data by searching for a receivable broadcast channel in the digital image display apparatus; and
linking image data and information data, respectively, with the channel list data, the image data and the information data being included in broadcast data, the broadcast data being stored in the digital image display apparatus in response to a broadcast data storing signal received for recording a program corresponding to the image data, wherein linking the image data and the information data includes providing a tag into a portion of the channel list data and a link point connected to the tag is included in the stored image data and the stored information data the tag being information that indicates a program is tagged, and the link point being information that indicates a point that is linked with the tag, wherein:
the channel list data is outputted through the digital image display apparatus to display link information of the image data and the information data, and
the stored information data corresponding to the image data is displayed as a result of the stored information data being linked with the image data when the image data is selected from the channel list data,
wherein the channel list data is electronic program guide (EPG) data for an electronic program guide to be displayed on the digital image display apparatus, and wherein the information data includes a textual description of the stored image data.

18. The non-transitory computer readable medium of claim 17, wherein the textual description of the image data describes at least one of a genre of the stored image data or a person or character in the stored image data.

19. The non-transitory computer readable medium of claim 17, wherein the information data further provides an indication of a broadcast time of the stored image data.

20. The non-transitory computer readable medium of claim 17, wherein the information data further provides an indication of a broadcast service used to broadcast the stored image data.

21. A device for providing information of image data stored in a digital image display apparatus, the device comprising:
a channel list generator to search for a broadcast channel received through the digital image display apparatus and to generate channel list data; and a linker to link image data and information data, respectively, with the channel list data, wherein the image data is included in broadcast data and is stored in the digital image display apparatus in response to a broadcast data storing signal received for recording a program corresponding to the image data, wherein:

the channel list data is outputted through the digital image display apparatus to display link information of the image data and the information data, and the information data corresponding to the image data is displayed as a result of the information data being linked with the image data when the image data is selected from the channel list data, and the channel list data is electronic program guide (EPG) data for an electronic program guide to be displayed on the digital image display apparatus, and wherein the information data includes a textual description of the stored image data, wherein the linker links the image data and the information data, respectively, to the channel list data by providing a tag into a portion of the channel list data generated by the channel list generator and including a link point connected to the tag in the stored image data and the stored information data, and the tag being information that indicates a program is tagged, and the link point being information that indicates a point that is linked with the tag.

22. The device of claim 21, wherein:
the image data and the information data are included in broadcast data, and
the broadcast data and the information data are stored in the digital image display apparatus in response to a broadcast data storing signal received for recording a program corresponding to the image data.

23. The device of claim 21, wherein the textual description of the image data describes at least one of a genre of the stored image data or a person or character in the stored image data.

24. The device of claim 21, wherein the information data further provides an indication of a broadcast time of the stored image data.

25. The device of claim 21, wherein the information data further provides an indication of a broadcast service used to broadcast the stored image data.

26. The device of claim 21, wherein the digital image display apparatus comprises:
a broadcast receiving unit to receive broadcast data;
an input unit to output an input signal corresponding to an inputted key;
a processor to generate a control signal for controlling an operation of the digital image display apparatus in accordance with the input signal outputted from the input unit;
a display unit to output video data of the received broadcast data;
a sound output unit to output audio data of the received broadcast data;
a storing unit to store the broadcast data; and
a broadcast processing unit.

\* \* \* \* \*